United States Patent [19]

Clark

[11] Patent Number: 4,746,480
[45] Date of Patent: May 24, 1988

[54] PROCESS FOR PROVIDING A PROTECTIVE OXIDE COATING ON CERAMIC FIBERS

[75] Inventor: Terence J. Clark, Summit, N.J.

[73] Assignee: Hoechst Celanese Corporation, Somerville, N.J.

[21] Appl. No.: 895,420

[22] Filed: Aug. 11, 1986

[51] Int. Cl.$^4$ .................. C04B 35/00; C04B 41/50
[52] U.S. Cl. .................................. 264/62; 264/82; 264/129; 264/211.15; 427/249; 427/255; 427/248.1
[58] Field of Search .................. 264/56, 60, 82, 62, 264/83, 129, 232, 234, 340, 345, 211.15; 501/154, 92; 427/249, 255, 248.1

[56] References Cited

U.S. PATENT DOCUMENTS

| | | | |
|---|---|---|---|
| Re. 31,947 | 7/1985 | Fan | 417/411 |
| 3,853,567 | 12/1974 | Verbeek | 501/92 |
| 4,242,487 | 12/1980 | Yajima et al. | 525/474 |
| 4,283,376 | 8/1981 | Yajima et al. | 423/345 |
| 4,310,651 | 1/1982 | Baney | 264/85 |
| 4,312,970 | 1/1982 | Gaul, Jr. | 526/279 |
| 4,340,619 | 7/1982 | Gaul, Jr. | 264/29.2 |
| 4,342,712 | 8/1982 | Yajima et al. | 264/65 |
| 4,399,232 | 8/1983 | Yajima et al. | 501/38 |
| 4,482,669 | 11/1984 | Seyferth et al. | 525/474 |
| 4,482,689 | 11/1984 | Haluska | 264/29.1 |
| 4,543,344 | 9/1985 | Cannady | 501/92 |

Primary Examiner—Jan H. Silbaugh
Assistant Examiner—Hubert C. Lorin
Attorney, Agent, or Firm—Depaoli O'Brien

[57] ABSTRACT

Thermally stable ceramic fibers are provided by pyrolysis of organosilicon preceramic polymeric fibers to ceramic form and contacting the ceramic fibers with an oxygen-containing gas so as to oxidize the surface of the fibers and form an in-situ oxide coating.

3 Claims, No Drawings

PROCESS FOR PROVIDING A PROTECTIVE OXIDE COATING ON CERAMIC FIBERS

RIGHTS OF THE GOVERNMENT

This invention was made with Government support under Contract No. F33615-83-C-5006 awarded by the Department of Defense (DOD). The government has certain rights in this invention.

FIELD OF THE INVENTION

This invention relates to a process for the production of ceramic fibers from organosilicon polymers. More particularly, the present invention is concerned with a novel process for improving the thermal stability of ceramic fibers which have been formed by the pyrolysis of organosilicon preceramic polymers and with thermally stable ceramic fiber products formed by such novel process.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organosilicon polymers have the potential to overcome these problems. To this end, polymers based on silicon, carbon and/or nitrogen and oxygen have been developed. See, for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol. 62, No. 8, pp. 893–915 (1983), and the references cited therein.

The major and most critical application for ceramics based on polymer processing is high strength, high modulus, reinforcing fibers. Such fibers are spun from organosilicon preceramic polymers and are subsequently converted to ceramic materials, in particular, silicon carbide/silicon nitride bearing fibers by a two-step process of curing to render the preceramic polymeric fibers insoluble followed by pyrolyzation comprising heating the fiber in an inert atmosphere up to about 2,000° C. whereupon the fibers are converted to ceramic form.

U.S. Pat. No. 3,853,567 is an early example of thermally treating a polysilazane resin to form ceramic articles comprising silicon carbide and/or silicon nitride. Thus, in Example 1 of the patent, a carbosilazane resin is formed, spun into filaments, the filaments rendered infusible by treating them with moist air for 20 hours at 110° C. and subsequently heated over the course of 7 hours to 1,200° C. in a nitrogen atmosphere and then to 1,500° C. over the course of 5 minutes. A black-glistening filament which is completely insensitive to oxidation at 1,200° C. and is amorphous to x-rays is disclosed as obtained. Subsequent heating to 1,800° under argon produced a fiber consisting of $\beta$-SiC, a little $\alpha$-SiC and $\beta$-SiC$_3$N$_4$.

U.S. Pat. No. 4,399,232 discloses forming continuous inorganic fibers consisting substantially of Si, Ti and C and optionally O obtained from pyrolyzing a polycarbosilane having side chains containing titanoxane units. The polycarbosilane is spun into fibers, the resultant fibers subjected to curing and the infusible fibers pyrolyzed into inorganic fibers. Free carbon in the fibers can be removed by heating the resulting inorganic fibers in an atmosphere of at least one gas selected from the group consisting of oxygen gas, air, ozone, hydrogen gas, steam and carbon monoxide gas preferably at a temperature of 800° C. to 1600° C.

While ceramic fibers formed from organosilicon preceramic polymers are intended to be used in high temperature environments, it has often been found that when aged at high temperatures, i.e., 1400° C. for 12 hours, these ceramic fibers are crystallized to an unusable brittle material whereby the thermal stability performance, i.e., change in weight and tensile properties, of the fiber are vastly degraded from original values. Thus, if ceramic fibers formed from organosilicon preceramic polymers are to be used to the fullest potential, there is a need for improving the thermal properties of such fibers and render them fully suitable for high temperature, high performance applications.

It is a primary object of the present invention to enhance the thermal stability performance of ceramic fibers which have been formed by the pyrolysis of organosilicon preceramic polymers.

It is another object of the present invention to provide thermally stable ceramic fibers from organosilicon preceramic polymers for use in high temperature, high performance applications.

These and other objects, aspects and advantages of the invention will be readily apparent to those of ordinary skill in this art upon consideration of the following description of the invention.

SUMMARY OF THE INVENTION

It has now been discovered that the thermal stability performance of ceramic fibers which are formed by the pyrolysis of organosilicon preceramic polymeric fibers is improved if a substantially continuous oxide coating is deposited on the ceramic fiber. Thus, ceramic fibers obtained from organosilicon preceramic polymers which have deposited thereon an oxide coating retain their weight and tensile properties from original values even when aged at high temperatures and for long periods of time, conditions resembling the high severity environment in which the ceramic fibers have potential use.

In accordance with the present invention, an oxide coating is provided in-situ on the ceramic fibers during pyrolysis of the organosilicon preceramic polymeric fibers or during a subsequent heat treatment of the formed ceramic fibers. The oxide coating is an in-situ oxidation of the fiber surface achieved by incorporating an oxidizing agent in the inert gaseous stream during pyrolysis of the preceramic polymer to ceramic form or similarly by incorporating an oxidizing agent into the gas stream used during a thermal treatment subsequent to pyrolysis. The oxidizing agent typically employed is oxygen or air provided in amounts sufficient to form an in-situ oxide skin on the fiber without otherwise altering the chemical structure of the remaining fiber and consequent degradation of tensile properties. It is believed that the oxide layer which is formed is most likely a crystalline, substantially continuous silicon dioxide layer. This silica coating is produced in-situ on the fiber surface by oxidation of the silicon atoms which form the backbone of the fiber.

In another aspect of the present invention, it has been found that certain organosilicon preceramic polymers when formed into ceramic fiber have an affinity for even trace amounts of oxygen. Thus, even $O_2$ impurity levels, e.g., 10 ppm, present in the inert gaseous streams used during pyrolysis or subsequent heat treatment are sufficient to oxidize the surface of fibers formed from these oxygen-attractive preceramic polymers. Fibers formed from such preceramic polymers are rendered more thermally resistant than ceramic fibers obtained from other organosilicon preceramic polymers because of the ability to produce a protective oxide coating on the surface of the fibers in the presence of only trace amounts of oxygen. Hydridopolysilazane is an example of a preceramic polymer which in the ceramic form has an affinity for trace amounts of oxygen such as to form an oxide coating on ceramic fibers obtained by pyrolysis thereof.

In general it is believed that all ceramic fibers obtained by pyrolysis of organosilicon preceramic polymers have the ability to form in-situ protective oxide coatings, although in varying degrees. Those ceramic fibers obtained from the most easily oxygen-attractive materials represent an important discovery in enhancing the use of ceramic fibers obtained from organosilicon polymers in high temperature, high performance applications as the thermal stability of such fibers can be maintained under the most severe conditions due to the oxide coating or film which will be formed.

DESCRIPTION OF THE PREFERRED EMBODIMENTS

Organosilicon preceramic polymers are well known in the art. Such polymers contain silicon, carbon and/or nitrogen, and oxygen, are fiber-forming, and can be cured and pyrolyzed to ceramic form. See, for example, U.S. Pat. Nos. 4,310,651; 4,312,970; 4,342,712; 4,482,689; and 4,340,619, which are incorporated herein by reference. Such polymers optionally may be modified with chemical groups to allow subsequent curing in the absence of oxygen. See, for example, U.S. Pat. Re. 31,947, which is incorporated herein by reference.

These organosilicon precursor polymers may be made in a variety of ways as is known in the art. For example, they may be made by first dechlorinating an alkylchlorosilane, e.g., dimethyldichlorosilane, and polymerizing the product to form a polysilane, e.g., polydimethylsilane. This material is then heated to convert its backbone of silicon atoms to a backbone of alternating silicon and carbon atoms by forming a polycarbonsilane.

Preferably, the organosilicon preceramic polymers utilized in the present invention consist essentially of silicon, carbon, nitrogen, and oxygen. Such polymers are typically prepared by reacting a disilazane and a dichlorodisilane or a methylchlorodisilane.

Thus, the preferred organosilicon preceramic polymers of the present invention are characterized as polysilazanes such as prepared from methylchlorodisilanes and hexamethyldisilazane. Particularly preferred are the polysilazanes, containing N—Si—Si—N linkages. The most preferred polysilazane is a hydridopolysilazane formed by reacting trichlorosilane with hexamethyldisilazane. The hydridopolysilazane has a very great affinity for oxygen which results in the formation of a protective oxide layer on the fiber even when in the presence of impurity levels of oxygen.

Optionally, the addition of difunctional monosilanes as co-reactants may be used to enhance spinning and/or subsequent fiber handling properties. Such difunctional monosilanes include preferably $R_1R_2SiCl_2$, where $R_1$ and $R_2$ may independently be an ethyl, phenyl or vinyl group. The organosilicon preceramic polymers may be further modified, for example, by incorporating vinyl functionality by reacting with the polymer itself. This may be achieved, for example, by co-reacting the polymer with a vinyl (Vi) halosilane such as $ViR_1R_2SiCl$, where $R_1$ and $R_2$ may each independently be methyl or phenyl.

Another preferred type of organosilicon polymer which is thermally sensitive and which may be especially suitable in the present invention comprises a plurality of cyclic and/or linear precursor residues of the repeating units of formula I:

(I)

linked together by $Si_2N_2$ bridges of formula II,

(II)

wherein R is hydrogen, a lower alkyl group having from 1 to about 6 carbon atoms, a substituted or unsubstituted vinyl group, a substituted or unsubstituted allyl group, a substituted or unsubstituted benzyl group, a substituted or unsubstituted lower aryl group having from 6 to about 10 carbon atoms, a tri(lower) alkyl or di(lower)alkylsilyl group, a di(lower)alkylamino group, a lower alkoxy group having from 1 to about 6 carbon atoms; and n is an integer greater than one. The substituted groups are substituted with lower alkyl and lower aryl groups.

These polymers form novel ladder-like or planar array structures that are soluble in common organic solvents, stable at room temperature and thermally stable up to about 550° C. The ladder-like or planar array polymers of the present invention are formed in high yield by reaction of the cyclic and/or linear residues in the presence of a basic catalyst capable of deprotonating an NH function adjacent to silicon. These polymers and their preparation are described more fully in U.S. Pat. No. 4,482,669 to Seyferth et al, assigned on its face to Massachusetts Institute of Technology, which patent is herein incorporated by reference.

It is preferred that the organisilicon preceramic polymer be devoid of metallic components which would be contained in the backbone of the formed ceramic fiber.

Molecular weight ($M_n$) for the above organosilicon preceramic polymers may vary from about 500 to 20,000 preferably about 700 to 5,000, and most preferably 1,000 to 2,000 (g/mole-GPC method). These polymers may also have softening temperatures ($T_s$) of about 50° C. to 308° C., preferably about 60° C. to 200° C., and most preferably 70° C. to 150° C.

The organosilicon preceramic polymers once formed are spun into fibers using any conventional melt spinning or dry spinning process. To melt spin, the solid organosilicon polymer is melted at a temperature and rate sufficient to avoid gelation and foaming, and substantially immediately thereafter the melted polymer is spun into fiber using a suitable spinning apparatus.

A relatively short residence time of the organosilicon polymer in the melt is desirable to achieving strong, fine diameter fibers. If an organosilicon polymer blend is brought up to a melt-processable or extrudable temperature and held at such temperatures for too long a period of time, gelation will occur, which in turn will lead to the presence of noticeable flaws in the fiber and a concomitant loss of tensile properties. In addition, the melt temperature of the organosilicon polymer melt should be less than that which would cause foaming of the polymer, which foaming will also lead to the presence of voids or flaws in the fiber. The typical organosilicon polymer is significantly more melt sensitive as compared to other conventional fiber-forming polymers, e.g., polyethylene terephthalate.

While allowable total melt residence time may vary from one particular organosilicon polymer melt to another, in general the total melt residence time should be less than thirty minutes, e.g., about one to twenty minutes, preferably less than about 10 minutes, and most preferably less than five minutes.

The actual melt temperatures of the respective polymer melts may vary, but will generally be above the softening temperature ($T_s$) of the polymers, but below that at which foaming, gelation or other degradation occurs within the total melt residence time. Typically, such melt temperatures will range from about 30 to 130, preferably from about 50 to 100, and most preferably 60° to 80° C. above the $T_s$ of each polymer.

If desired, the organosilicon polymer may be blended with another thermoplastic polymer to improve the spinning properties. Suitable polymers for blending can be selected generally from various types which improve the processability of the organosilicon preceramic fiber. The polymers blended should be mutually compatible, physically, and chemically. In other words, the melting points of the polymers used in the melt blend should be comparable. The combined polymers can thus be melted to form a homogenous blend having a suitable viscosity for spinning without approaching temperatures at which the thermally sensitive organosilicon polymer might tend to cross-link or any of the additional polymers might reach decomposition temperature. The polymer should not form separate phases when blended together in melts or solutions, and should not react with or otherwise degrade each other. Some compatible resins include vinyl polymers and copolymers, diolefin polymers, polyethers, polythioethers, polyesters, polyamides and polypeptides.

To dry spin, the solid organosilicon polymer is dissolved in a suitable solvent at suitable polymer solids concentrations and spun on conventional dry spinning apparatus. Solvents with relatively low boiling points are preferred to permit the efficient extraction of solvent from the spun fibers without adversely affecting the organosilicon polymer. Particularly preferred solvents are toluene and xylene. Relatively high solids concentrations of the organosilicon polymer in the spinning solution is important to achieve a self supporting threadline with these relatively low-molecular weight, highly branched organosilicon polymers. Typical polymer solids concentrations of at least about 70 to about 80% are useful. Again, a compatible polymer which can be dissolved in the identical solvent for dissolving the perceramic polymer or a solvent compatible with the preceramic polymer solvent may be added to the spinning solution of organosilicon preceramic polymer to improve spinning properties.

After spinning, the preceramic fibers are typically cured or cross-linked and thereafter pyrolyzed to ceramic form.

Effective curing conditions are defined as those curing conditions after which the organosilicon preceramic fibers become infusible and the fibers may be pyrolyzed without melting or fusing together. A variety of curing methods may be used. These include oxidative and hydrolytic cures, reactive cures, thermal cures, and radiolytic cures. The presently preferred method of curing is via an oxidative/hydrolytic cure. Typically, this entails heating the fibers in a controlled humidity environment, where humidity can range from about 8 to 100%.

Curing may be carried out at temperatures from about 50°–400° C., the rate of curing increasing as the temperature increases.

The cured preceramic fibers are then pyrolyzed at about 1200° C. to convert the fibers to ceramic form. Although the heating rate may vary, typical heating rates during pyrolyzation comprise about 3° C. per minute from room temperature up to about 1100°–1200° C. Pyrolyzation is typically carried out in an inert atmosphere such as nitrogen, argon, or in a vacuum.

The oxide coating which is formed on the ceramic fiber is obtained by oxidizing the surface of the fiber in-situ. This is achieved by incorporating an oxygen-containing gas into the inert gaseous stream during pyrolysis of the preceramic polymer to a ceramic form. Generally, only minute amounts of oxygen-containing gas, e.g. 10 ppm to about 10,000 ppm $O_2$, preferably about 100 ppm to about 1000 ppm $O_2$ relative to the the inert gaseous stream is necessary to provide the oxide coating which is formed as a continuous or semicontinuous film over the surface of the ceramic fiber. The amount of oxygen-containing gas needed to form the oxide film will vary depending upon the affinity of the ceramic for oxygen. For example, hydridopolysilazane polymers as defined previously, upon being pyrolyzed to ceramic form, can absorb even impure or trace amounts of oxygen. Accordingly, ceramic fibers formed from such polymers require as little as 10 ppm to at most about 10,000 ppm $O_2$ relative to the gaseous stream to form the oxide film. On the other hand, ceramic fibers formed from such silazanes as methylpolydisilylazane and polycarbosilane will require a relatively higher concentration of oxygen in the inert gaseous stream, e.g., 10 ppm $O_2$ will not produce the desired oxide layer.

The oxide film which is formed typically appears as an iridescent sheen atop the black ceramic fiber. The oxide layer which is formed can be increased by increasing the amount of oxygen in the inert gas stream. While the oxide film is most preferably restricted to a surface layer, oxide films (20 to 200 nm thickness) approaching about 0.2 to 2% of the cross-section of the ceramic fiber are useful.

As an alternative to forming the oxide coating during pyrolysis of the ceramic fiber, a subsequent heat treatment may be used. In this instance, the ceramic fiber after pyrolysis is again heated to temperatures in the range of 1000°–2000° C. in an inert atmosphere which contains sufficient amounts of the oxygen-containing gas to form the surface oxide film. The concentration of oxygen-containing gas in the inert gas stream should be sufficient to form the oxide film without adversely affecting the ceramic structure. Concentrations set forth above for forming the oxide film during pyrolysis are applicable in this alternative process. Again, depending upon the organosilicon preceramic polymer which is used to form the ceramic fiber, varying amounts of oxygen-containing gas will be required.

It is believed the oxide layer or film which is formed on the fiber whether formed during pyrolysis or subsequent heat treatment is obtained by oxidation of surface silicon atoms to silicon dioxide. The coating comprises partially crystalline silica. The silicon atoms form the backbone of the ceramic fiber upon pyrolysis and are apparently oxidized by the oxygen-containing gas contained within the inert stream during heat treatment. The oxygen-containing gas is preferably oxygen or air, but may include $CO$, $CO_2$, $NO_2$, water vapor, alcohols, and acids.

The ceramic fibers which contain the oxide coating or film thereon, are more thermally stable than prior fibers. The oxide coating acts as a protective layer upon exposing the ceramic fibers to high severity environments. Thus, the weight of the fiber as well as the tensile properties of the fibers are maintained. This property is important since ceramic fibers formed from organosilicon preceramic polymers are intended for use in the high temperature environments such as found in gas turbine components. The oxide layer apparently reduces the decomposition and/or the crystallization of the ceramic fibers.

The following examples are illustrative of the invention only and are not included so as to limit the scope of the invention.

EXAMPLE 1

Into a resistance heated tube furnace were charged hydridopolysilazane ceramic fibers, ½ gram in weight, which had been cut into 6.7 cm lengths. After the addition, the furnace ends were sealed by caps which had valved ports that enabled vacuum evacuation as well as gaseous flow of the experimental atmosphere after evacuation. A vacuum of $10^{-2}$ torr was obtained prior to the test to help ensure that the amount of oxygen within the tube was that of the desired experimental atmosphere during the test. The fiber was heated up to 1400° C. at a schedule of: 20° C. to 950° C. at 3° C./min, 950° C. to 1200° C. at 6° C./min, and 1200° C. to 1400° C. at 10° C./min. A 12 hour hold was used at 1400° C. followed by furnace cooling. To promote oxide layer growth, a gas of known concentration of $O_2$ (1000 ppm $O_2$ in argon) was used as the purge and test gas. The flow of gas was measured to be 7.9 ml/sec. The oxygen content of the gas was checked by using a zirconia-sensor trace oxygen analyzer. After heat treatment and upon cooling, the thus obtained oxide coated fiber was seen to possess an irridescent sheen. The diameter of the resulting fiber was 15 $\mu$m (an increase of about 1 $\mu$m from the original diameter); the tensile strength and coefficient of elasticity thereof were 834 MPa and 179 MPa, respectively. X-ray microanalysis of the fiber section showed that the fibers were amorphous inorganic fibers consisting of a surface of amorphous-to-partially crystalline Si and O and an interior consisting of Si, N, C and O.

In comparison, it has been found that fibers heated at 1400° C. in the absence of small amounts of oxygen in the furnace, retain no strength and turn to dust upon the slightest handling due to the fine crystals produced.

EXAMPLE 2

The process of Example 1 was followed to heat treat a ceramic fiber formed from a polycarbosilane. The formation of an oxide coating is similarly observed; the tensile strength and coefficient of elasticity thereof were 579 MPa and 158 MPa, respectively.

What is claimed is:

1. A process for improving the thermal stability of ceramic fibers by providing a protective oxide coating on said ceramic fibers comprising: forming a ceramic fiber by pyrolyzing a fiber spun from a polysilazane preceramic polymer and after pyrolysis heat treating said ceramic fiber in an inert gas containing 10 ppm to 10,000 ppm as $O_2$ of an oxygen-containing gas to form an in situ oxide coating on said ceramic fiber.

2. The process of claim 1 wherein said oxygen-containing gas comprises air or pure $O_2$.

3. The process of claim 1 wherein said polysilazane is a hydridopolysilazane polymer formed by reacting trichlorosilane with hexamethyldisilazane.

* * * * *